J. SIMPSON.
TRANSFER APPARATUS FOR SHEAR TABLES.
APPLICATION FILED DEC. 19, 1908.
944,972.
Patented Dec. 28, 1909.
2 SHEETS—SHEET 1.
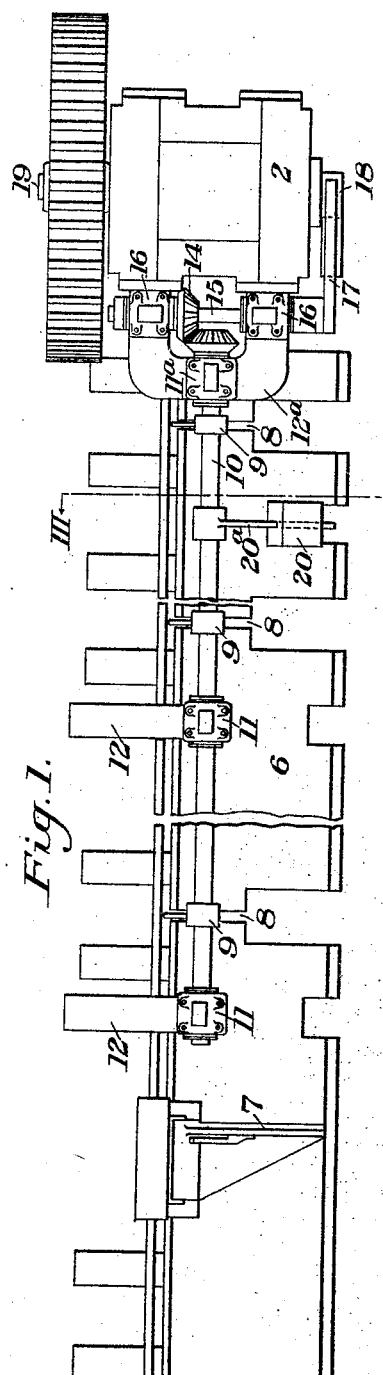
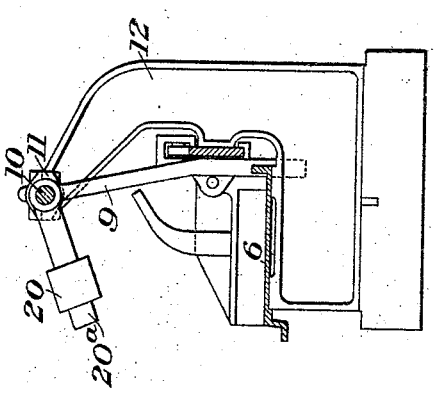
WITNESSES
R. H. Balderson
G. L. Wuiters
INVENTOR
Jas. Simpson
by Bakewell, Byrnes & Parmelee
his Attys

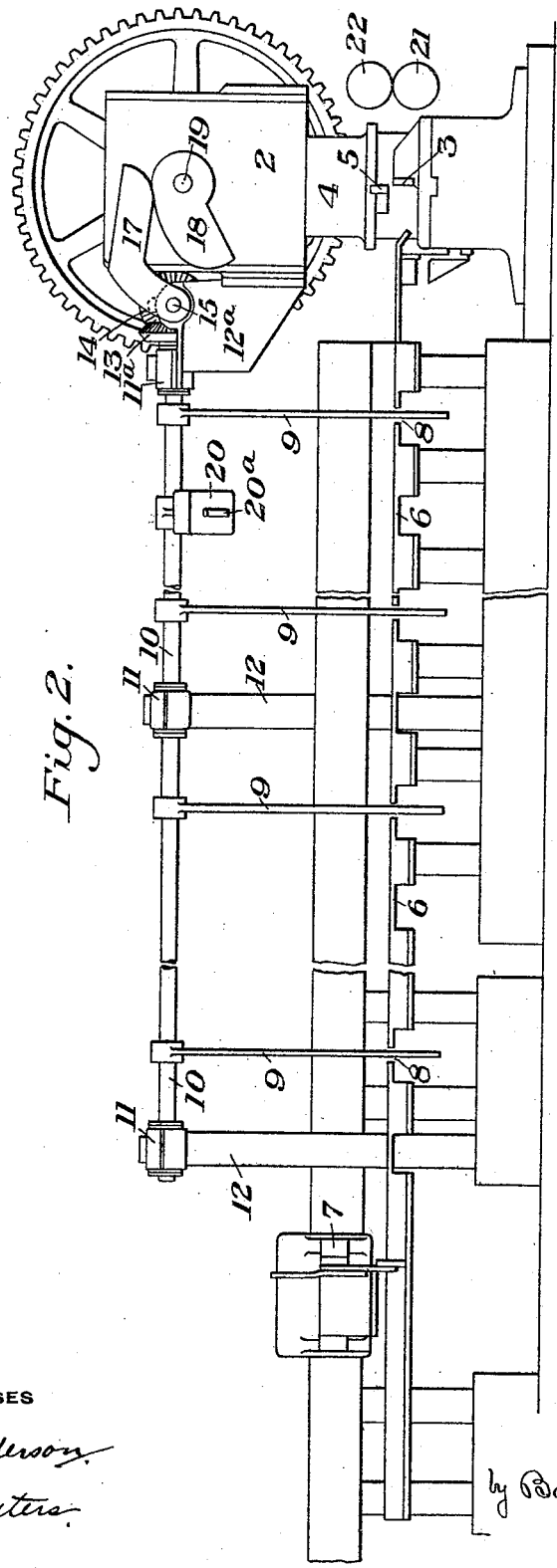

UNITED STATES PATENT OFFICE.

JAMES SIMPSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

TRANSFER APPARATUS FOR SHEAR-TABLES.

944,972. Specification of Letters Patent. Patented Dec. 28, 1909.

Application filed December 19, 1908. Serial No. 468,332.

*To all whom it may concern:*

Be it known that I, JAMES SIMPSON, of McKeesport, Allegheny county, Pennsylvania, have invented a new and useful Improvement in Transfer Apparatus for Shear-Tables, of which the following is a full, clear, and exact description, reference being had to the accompanying drawings, forming part of this specification, in which—

Figure 1 is a plan showing my improved apparatus constructed and arranged in accordance with my invention and applied for use in connection with a shear and shear table; Fig. 2 is a longitudinal side elevation of the same; Fig. 3 is a sectional end elevation of the shear table and transfer mechanism on the line III—III of Fig. 1.

My invention relates to the handling of long flexible rolled metal shapes after having been sheared to length and it more particularly relates to the handling of long, thin, narrow plates known to the trade as skelp or pipe skelp.

The object of the invention is to provide novel means for handling such materials after having been sheared, by the use of which delays in the shearing operations are prevented and the output of the shearing mechanism is greatly increased.

Another object of my invention is to provide improved apparatus by the use of which the damage to the materials while being handled is prevented, and improved means for operating the transfer mechanism.

A further object of the invention is to provide means for actuating the transfer mechanism in such manner as to utilize the interval of time in which the shear knives are in their inoperative position for performing the transfer operation and means by which the transfer mechanism is automatically returned to position after each transfer movement.

In the drawings, 2 represents a well-known type of shear having a lower stationary shear knife or blade 3 and a reciprocating ram 4 with a movable shear blade 5 secured thereto. A shear table 6 on which the plates or other materials are delivered after the shearing operation, is located in rear of and in line with the shear 2. The shear table 6 is provided with an adjustable gage 7 which is arranged to be moved longitudinally along the length of the table to different locations to form a stop against which the sheared or front end of the plates strike and in this way regulate the cutting off of the plates to the desired length. The series of transverse gaps 8 are provided in the top surface of the shear table 6 to form passageways for the depending rocking arms 9 which are secured on the rocking shaft 10 at intervals in its length. The shaft 10 extends lengthwise of and above the shear table 6, being mounted in bearings 11 on the top of the bearing stands 12. The end of the shaft 10 adjacent to the shear is provided with a bevel gear 13 which meshes with a similar bevel gear 14 on the shaft 15. The shaft 15 is mounted in bearings 16 which, together with the bearing 11$^a$ for the shaft 10, are mounted on the bracket 12$^a$ which is bolted or otherwise secured to the side of the frame of the shear 2. The end of the shaft 15 is provided with a rocking arm 17 which engages with and is actuated by the cam 18 which is secured to and rotates with the shaft 19 on the shear by which the ram 4 is reciprocated in actuating the movable cutting knife of the shear.

A counterweight 20 is mounted on a lever 20$^a$ on the shaft 10 so as to automatically bring the swinging arms 9 into their inoperative position out of the path of the plates being delivered from the shear to the shear table 6.

The shear is provided with pinch rolls 21 and 22, the pinch roll 21 being positively rotated and the pinch roll 22 being arranged to move vertically toward and away from the pinch roll 21 so as to cause the plates when between these rolls to be fed forwardly between the shear knives and on to the table 6 when sufficient pressure is put on the movable pinch roll 22 by the shearman or operator.

In the operation of my improved transfer mechanism, the plates or other materials to be sheared are successively fed forward between the shear knives 3 and 5. Each plate is first fed forwardly and the front end is cropped. The plate is then fed forwardly by the operator by means of the pinch rolls 21 and 22 until the forward end of the plate is in engagement with the gage or stop 7. The shear knives are then actuated to cut the plate to length. On the return movement of the plunger or ram 4 of the shear, the rotating cam 18 engages with the rocking arm 17 on the shaft 15 and through the bevel gears 13 and 13 rocks the shaft 10. When the shaft 10 is rocked, the depending arms 9 will be positively swung outwardly and by engagement with the longitudinal edge of the plate which has just been sheared, will shift this plate transversely across the width of the shear table 6 and push the plate off the table and out of the path of the next plate to be sheared. When the cam 18 becomes disengaged by reason of its rotation from the swinging arm 17, the counterweight 20 will act to bring the swinging arms back into the position shown in Fig. 3, in readiness to again shift the plate sidewise when the shaft 10 is actuated. As the plates are successively sheared to length, they are removed by the above described operation from the table and out of the way of the next plate.

The stop 7 is arranged to be adjusted along the length of the table 6 into different positions so as to permit of the plates being sheared to any desired length.

The advantages of my invention will be appreciated by those skilled in the art. The use of my improved transfer mechanism permits the thin flexible plates to be removed from the shear table without distortion or damage to the plates. The transfer mechanism is arranged to be actuated during the time that the movable shear knife is being moved back to its operative position. The transfer mechanism is actuated automatically with the movement of the shear knives and in this way accident or delays to the apparatus are prevented and the output of the shearing mechanism is greatly increased.

Modifications in the construction and arrangement of the parts may be made without departing from my invention.

The transfer mechanism is applicable to other uses than that shown and described.

I claim:—

1. Apparatus for handling metal plates, comprising a shear, a plate receiving table on which the sheared plates are delivered endwise from the shear, mechanism arranged to shift the plates from the table sidewise across the width of the shear table, and a cam on said shear arranged to actuate the shifting mechanism when the shear is actuated; substantially as described.

2. Apparatus for handling metal plates, comprising a shear, a plate receiving table, on which the sheared plates are delivered endwise from the shear, mechanism arranged to shift the plates sidewise from the table, and means operated by the shear arranged to actuate the plate shifting mechanism when said shear is moving into its operative position; substantially as described.

3. Apparatus for handling metal plates, comprising a shear, a plate receiving table on which the sheared plates are delivered lengthwise from the shear, a rocking shaft having depending arms arranged to contact with and move the plates on said table sidewise across the width of the table, an arm connected with said shaft, and a cam on the shear arranged to contact with said arm and cause the depending arms to shift the plates on the table across the width of the table; substantially as described.

4. In apparatus of the class described, the combination with a shear and a shear table in front of said shear having rocking means for transferring plates sidewise across the width of the shear table, of means for positively rocking the plate transferring means in one direction and a counterweight for rocking the transferring means in the opposite direction; substantially as described.

5. In apparatus of the class described, the combination with a shear and a shear table located in front thereof, of mechanism for transferring plates sidewise on said shear table and means for actuating the transfer mechanism to shift the plates while the shear is returning into its cutting position; substantially as described.

6. In apparatus of the class described, the combination with a shear and a shear table located in front thereof, of mechanism for transferring plates sidewise on said shear table and gearing connecting the shear and transfer mechanism for actuating said transfer mechanism when the shear is operated; substantially as described.

In testimony whereof, I have hereunto set my hand.

JAMES SIMPSON.

Witnesses:
   Jas. P. Davis,
   R. E. Porter.